Nov. 13, 1962  E. V. PODEBRADSKY  3,063,842
METHOD OF PREPARING SKINLESS SAUSAGE-TYPE PRODUCT
Filed Oct. 13, 1959
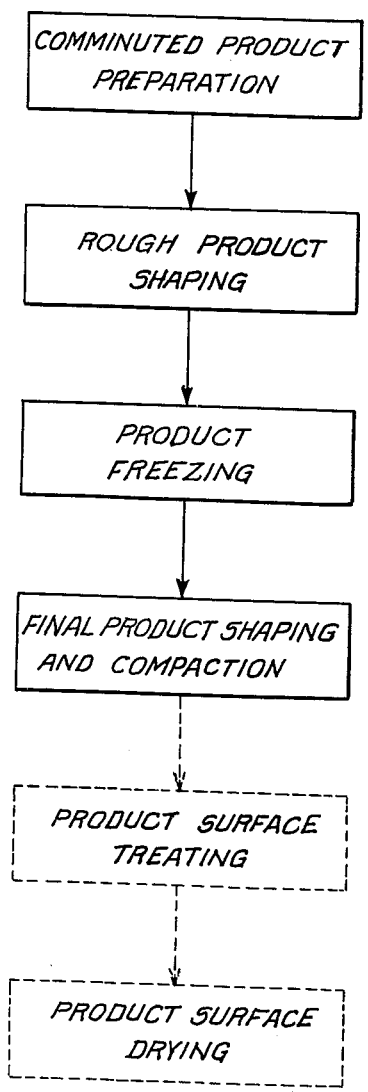
INVENTOR.
Everett V. Podebradsky,
BY
Cromwell, Greist + Warden
Attys.

United States Patent Office 3,063,842
Patented Nov. 13, 1962

3,063,842
METHOD OF PREPARING SKINLESS SAUSAGE-TYPE PRODUCT
Everett V. Podebradsky, Madison, Wis., assignor to Oscar Mayer and Company, Inc., Chicago, Ill., a corporation of Illinois
Filed Oct. 13, 1959, Ser. No. 846,168
15 Claims. (Cl. 99—109)

The present invention relates to a new and improved method of preparing uncooked skinless sausage-type products from any suitable meat source, such as meat trimmings. More specifically, the invention is directed to a method and product formed thereby, which method constitutes an improvement over those now practiced in forming commercially available uncooked skinless comminuted meat products, the subject method providing for a material improvement in the self-sustaining characteristics of uncooked sausage products as well as in at least virtually eliminating the tacky properties of such products.

Uncooked sausages of separate link shape are commerically available in several different forms. The basic sausage product is encased in a natural or synthetic casing material which is relatively tough but fully edible following cooking of the sausage. Such casings not only retain the sausage mix in link shape and prevent breaking or crumbling thereof during handling, but additionally present a smooth, generally non-tacky surface preventing adherence of the encased sausages to the packaging material or cohence thereof to one another to an extent which would make the same rather difficult to separate for handling and cooking purposes. However, the cost of the casings adds materially to the total costs of manufacturing the product and it has always been considered desirable to eliminate the use of casings.

In order to eliminate the use of and avoid the relatively tough mastication properties of natural and synthetic casings, skinless sausages are prepared on a commercial basis. The comminuted sausage mix is inherently cohesive to an extent which promotes a certain degree of self-sustenance to the individually formed link-like sausages and skinless links have been prepared by extruding sausage mix under pressure to form the same. However, the link-type product formed usually has a rough shape which is not sufficiently uniform and when warmed slightly, as when left at room temperature, the product has a sticky surface and tends to crumble or fall apart when handled. As long as products of this type are retained in the frozen, or at least shell frozen state, the problem of crumbling is overcome but the sticky surfaces remain.

In a further effort to overcome the aforementioned disadvantages of uncooked skinless products, a partially precooked skinless sausage has been merchandised. The cooking is carried to an extent that the self-sustaining properties of the individual sausages are greatly improved and tackiness is virtually eliminated by reason of the provision of a relatively hard cooked surface crust. However, pre-cooking constitutes a rather substantial added cost to the sausage manufacturing procedure and, accordingly, this increase in manufacturing cost must be reflected in the merchandising price of the product.

It is an object of the present invention to overcome the foregoing problems by providing a new and improved method of preparing uncooked skinless sausage-type products, which method includes the forming and treating of the skinless product in such a manner that the same is adequately self-sustaining and non-tacky for improved efficiency in handling, packaging and merchandising thereof.

Another object is to provide a new and improved method of forming and shaping by molding a skinless pork sausage, the method being readily adapted for application in forming any products similar to the conventional uncooked sausage product, the method being especially adapted for treatment of comminuated meat products to impart to and retain in such products good self-sustaining properties, adequately smooth and non-tacky outer surfaces, good appearance and good color.

Still another object is to provide a new and improved method of preparing uncooked skinless sausage-type products, which method includes the steps of roughly shaping individual sausage-type products from a comminuted meat mix, at least shell freezing the products to an extent that substantial water crystallization occurs at and immediately below the surfaces thereof, and molding the products into finished shape while the same are still at least shell frozen, the molding step comprising the use of adequate compaction pressure resulting in permanent compaction of the individual products to an extent that expansion thereof following mold release is not evident.

A further object is to provide a new and improved method of the type described in the foregoing objects wherein the unique product surfaces formed as a result of a practice of the steps outlined above are further enhanced with regard to non-tacky properties and smooth appearance by the subjection of the compacted and finally shaped product to a hot liquid treatment step while the product is still in its shell frozen state.

Other objects not specifically set forth will become apparent from the following detailed description of the present invention made in conjunction with the accompanying drawing which constitutes a flow sheet of the method specifying the various operational steps thereof.

As illustrated in the accompanying flow sheet with regard to the steps specified in solid outline, it has been found that a new and improved uncooked skinless sausage-type product can be prepared by sub-dividing a prepared product mix into individual roughly shaped product portions, at least surface freezing the individual product portions, and shaping the surface frozen product portions to obtain the final desired product shape and surface smoothness while materially compacting the same. In an alternative procedure, the properties of the product may further be enhanced by treating the frozen surface of the product with a hot liquid and subsequently surface drying the product as set forth in the drawing with respect to the additional step specified in broken line outline. In using the basic method without the additional steps of liquid treatment and drying, it is possible to obtain a skinless sausage-type product which has a smooth shape of pleasing finished appearance, which is more internally cohesive and self-sustaining for efficient handling thereof at room temperature, and which has indefinitely eliminated therefrom any tendency to stick to other surfaces or adjacent products under temperature conditions such as 40° F. In describing in detail the various steps of the method, commercial pork sausage will be used as an example of the type of product which can be advantageously formed by practicing the method. However, it should be understood that the method is applicable to any uncooked comminuted meat products of the type normally formed from meat trimmings, which products exhibit the tendencies of surface-tackiness and poor self-sustenance, particularly at room temperatures.

As conventionally practiced, a pork sausage mix is prepared by chopping pork trimmings with spice and the like, preferably at a low temperature. The comminuted mix is placed in a stuffer and extruded therefrom under pressure. In carrying out the method of the present invention, extrusion occurs to form roughly shaped individual sausages of low weight segments which are collected and maintained in separated relation for freezing. The roughly shaped sausages are at least shell frozen in a freezer.

Freezing should be carried out to an extent that substantial water crystallization occurs at and immediately beneath the surfaces of the sausage.

Controlled freezing of the roughly shaped sausages is an important aspect of the present invention. Meat is generally somewhat elastic and in treating the surfaces of sausages formed in accordance with the teachings of the present invention, the meat mix must be frozen to an extent that it will lose its elasticity upon subsequent compaction during final shaping in a closed mold as will be described. To bring this about there must be adequate water content of the sausage in crystalline state to prevent subsequent expansion thereof upon mold release following compaction and final shaping.

In connection with the foregoing, it has been found that the sausage products should be at least shell frozen to an average overall temperature which is no greater than about 20° F. The shell freezing of the product provides for water crystal formation at and near the surfaces thereof which is essential to efficient compaction of the product. Accordingly, in commercial practice of the invention, the shell temperature of the product may be materially below 20° F. but the overall temperature should be at least as low as about 20° F. As to much lower overall temperatures such as minus 20° F., it has been found that the fat particles present in the product may be subject to fracture resulting in a somewhat undesirable excessive release of the fat on cooking of the product. This factor also tends to cause undesirable crumbling of the sausage on cooking thereof.

The shell frozen sausages are then molded to final shape by compression thereof in any suitable molding apparatus. Obviously, the sausages may be molded to many different shapes but it is generally desirable to maintain the standard cylindrical sausage shape for ease of handling, cooking, etc. In the shell frozen condition, the sausage is readily formable to an extent that a smooth surface is imparted thereto. Final shaping may be accomplished by placing each individual sausage in a closed cylinder-type mold into which a piston is reciprocally movable, the piston upon movement into the mold compressing the sausage against the smooth mold surfaces to not only shape the sausage but also impart thereto the desired smooth surface. The molding pressure required will vary depending upon the average overall temperature of the sausage. Molding pressure should be adequate to impart to the sausage the requisite smooth surface for subsequent treatment. It is not necessary to compress the sausage in the mold for an extended period of time in an effort to improve the cohesive qualities thereof, and the mold compression time may be as short as one second or less. It will be appreciated that the shell frozen sausage at this stage of the operation is readily formable and the frozen state of the surface components thereof permits quick and efficient smoothing of the same.

The molding step of the method of the present invention must be carried out under adequate pressure which is related to the average overall temperature of the sausage to result in permanent compaction of the sausage to preclude expansion thereof following mold release. This is an important aspect of the present invention and it has been found that molding pressures should be at least about 200 p.s.i. in order to obtain the desired results. Depending upon the extent to which the sausage is shell frozen, the molding pressure utilized may be substantially greater than 200 p.s.i. It has been found that the compression or compaction time is not critical providing adequate compaction occurs. As stated above, the compression time may be as short as one second or less which is of particular advantage in utilizing the method in a continuous machine operated production line. In this respect, the molding pressure is preferably momentarily applied such as by being made virtually instantaneous by continuously changing the sausage confinement pressure in the mold from zero pressure to maximum pressure back to zero pressure. Thus the maximum molding pressure need merely be reached or attained and not necessarily held for any readily measurable period of time. During the molding step of the method, it is essential that the sausage product be maintained at a suitable average overall temperature, which is that reached during the shell freezing step, to assure the best results. It will be appreciated that this necessity does not create any particular problem in that the sausage may be deposited in a mold, compacted and discharged from the mold within a matter of seconds.

With the basic method of the present invention completed to the extent described, the finished product exhibits a very adequate resistance against crumbling upon subsequent handling, merchandising and cooking. Of equal if not more importance, the product with a very smooth and virtually dry surface with the usual tackiness of such products being at least virtually if not completely eliminated. The product may be readily packaged and handled for packaging without undue sticking to the packaging material and a plurality of products exhibit an exceptionally good appearance in the usual type of transparent package. By way of example, sausage products prepared in accordance with the manner described do not stick at all to well known packaging materials such as cellophane nor do they stick to one another thus permitting easy and convenient separation upon use by a consumer. Packaged products can be held at temperatures in the neighborhood of 40° F. for merchandising purposes without evidence of tackiness and it has been found that in order to recreate surface tackiness on the treated products, it is necessary to subject the same to a combination of relatively high temperatures and humidities which are of a nature well recognized to be extremely adverse to the preservation of meat products.

The method of the present invention also includes further processing of the uncooked sausage following final shell frozen shaping thereof where such further processing is considered desirable. The sausage, which is at least shell frozen, is treated with a hot liquid to further modify the surface characteristics thereof. The liquid may be an aqueous solution which, by way of example, may contain therein sodium chloride and dextrose. A preferred solution will contain about 20% sodium chloride and about 8% dextrose. The solution temperature will preferably range from about 120° F. to 210° F. with a desirable temperature being about 160° F.

A practical procedure followed in treating the finally shaped sausage involves the momentary dipping of the sausage in the hot solution. The length of time of immersion will vary with the temperature and nature of the surface portion of the product. This time should preferably be about one second or less but can be extended to as much as about five seconds. Immersion or treating time will vary according to the temperature of the solution with hotter solutions requiring shorter immersion times and colder solutions requiring longer immersion times. By way of example, at 120° F. the treatment time may be about 5 seconds, at 160° F. about 1 second, and only a fraction of a second at 210° F. Excessive immersion or treatment of the sausage in the solution can cause excessive melting of the fat component in the surface portions thereof and can also cause deterioration of the desirable color of the lean meat component thereof. Furthermore, treatment should not be carried out to an extent that the shell frozen condition of the surface of the product is eliminated. In other words, a quick dip is essential as the frozen condition of the product surface must be maintained while permitting adequate modification of the surface by the hot solution to obtain the desired results. Any suitable method of treatment may be used including spraying of the hot solution onto the product as well as dipping of the product in the solution.

Following hot liquid treatment, the sausage surface is preferably rapidly dried by moving air across the same.

The sausage, still frozen, is then ready for packaging in accordance with any suitable procedure. With the additional treatment described, it has been found that the product may withstand higher temperature conditions or generally adverse temperature conditions for longer time periods without the development of surface tackiness. Accordingly, this further treatment is optional and its use will depend on conditions existing with respect to packaging, storing, merchandising, etc., of the product. By way of example, the hot solution treatment may be useful in connection with eliminating any possible sticking of the product to special packaging or wrapping materials such as wax paper. There is no noticeable skin formation on the surface and subsequent cooking of the product provides an excellent textured product which may be readily handled for serving without crumbling or breaking and which is very easily and readily masticated without the presence of a tough skin or the like.

The following examples are illustrative of procedures by which the method of the present invention may be practiced.

*Example I*

Pork trimmings at a temperature of 28° F. were mixed and chopped with suitable spices in a known type of sausage chopper operated at slow speed. The chopping was carried out for a period of three minutes. The comminuted mix was placed in a standard type stuffer from which it was extruded in separate one-ounce segments using approximately 90 p.s.i. during extrusion. The individual sausage segments having average dimensions of about ⅝ inch in diameter and 5 inches in length were placed in a freezer operated at a temperature of minus 40° F. and held therein for approximately 10 minutes. The sausage segments removed were at least shell frozen and had an average overall temperature of about 10° F. The segments were then placed in a shaping device consisting of a mold into which a piston reciprocated to compress and form the segments to the shape of the mold. The piston applied approximately 500 p.s.i. on the sausage segments confined in the mold and these segments were shaped in conventional link form with their surfaces being quite smooth. During shaping, the maximum pressure was applied for less than one second to each segment and the frozen condition of each segment was maintained. The products had average dimensions of about ¾ inch in diameter and 4 inches in length. These products were then packaged in the usual manner.

*Example II*

Sausage products were prepared in accordance with the procedure set forth in Example I and following final shaping and compaction thereof the individual links were then immersed by dipping in an aqueous solution of 20% sodium chloride and 8% dextrose maintained at a temperature of 160° F. Each link was dipped for one second in the solution and immediately withdrawn therefrom without losing its frozen condition other than to the extent of the surface treatment afforded by the hot solution. The treated links were then surface dried by rapidly moving air, and packaged.

*Example III*

The procedure set forth in Example II was repeated with the exception that the treating solution was merely water maintained at a temperature of 150° F.

*Example IV*

The procedure of Example II set forth was repeated with the exception that the treating solution of Example I was maintained at a temperature of 210° F. and the links were immersed therein for only a fraction of a second.

*Example V*

The procedure of Example II was repeated with the solution used being 10% sodium chloride maintained at a temperature of 120° F. The dip time was about 5 seconds for each link.

*Example VI*

The procedure of Example II was repeated during a solution of 5% hydrolyzed vegetable protein.

*Example VII*

The procedure of Example II was repeated using a 3% alum solution.

*Example VIII*

The procedure of Example II was repeated using a solution of 20% sodium chloride, 20% corn syrup (40 D.E. 80% solids) and 3% hydrolyzed vegetable protein.

*Example IX*

The procedure of Example II was repeated using a 10% calcium acid phytate.

*Example X*

Pork trimmings at a temperature of 28° F. were mixed and chopped with suitable spices in a known type of sausage chopper operated at slow speed. The chopping was carried out for a period of three minutes. The comminuted mix was placed in a standard type stuffer from which it was extruded in separate one-ounce segments using approximately 90 p.s.i. during extrusion. The individual sausage segments having average dimensions of about ⅝ inch in diameter and 5 inches in length were placed in a freezer operated at a temperature of minus 40° F. and held therein for approximately 5 minutes. The sausage segments removed were at least shell frozen and had an average over-all temperature of about 20° F. The segments were then placed in a shaping device consisting of a mold into which a piston reciprocated to compress and form the segments to the shape of the mold. The piston applied approximately 200 p.s.i. on the sausage segments confined in the mold and these segments were shaped in conventional link form, with their surfaces being quite smooth. During shaping, the maximum pressure was applied for less than one second to each segment and the frozen condition of each segment was maintained. The products were then packaged in the usual manner.

The treated sausages obtained from the foregoing examples were found to be greatly improved upon handling when warmed to temperatures as high as 40° F. The individual links were readily separated one from the other as well as from the packaging material and these links were adequately self-sustaining for efficient transferring thereof from the package to a cooking utensil even after standing at room temperatures for a period of time. The appearance of the links was quite good and it was particularly noted that the surfaces thereof were very smooth. The links were cooked in the conventional manner and were readily transferred without crumbling or breakage from the cooking utensil to a serving plate.

It will be understood that the composition of the treating solution may vary considerably. As illustrated in Example III above, this solution may merely consist of heated water, but it should be understood that special treating compositions and the like may be added to the water and dipping solution formulation. The sodium chloride and dextrose added as set forth above has been found to be particularly desirable not only from the standpoint of surface treating results, but also from the standpoint of final taste of the product. In this respect, the taste of the product can be varied according to the ingredients used in forming the treating solution.

Obviously certain modifications and variations of the invention as hereinbefore set forth may be made without departing from the spirit and scope thereof, and therefore only such limitations should be imposed as are indicated in the appended claims.

I claim:
1. The method of preparing an uncooked sausage-type product from a comminuted meat mix, said method comprising roughly shaping an individual sausage-type product from said mix, at least shell freezing said product to an average overall temperature no greater than about 20° F., and molding said product at said average temperature into finished shape while still at least shell frozen and under molding pressure of at least about 200 p.s.i.

2. The method of preparing an uncooked sausage-type product from a comminuted meat mix, said method comprising roughly shaping an individual sausage-type product from said mix, at least shell freezing said product to average overall temperature no greater than about 20° F., and molding said product at said average temperature into finished shape while still at least shell frozen and under molding pressure of at least about 200 p.s.i., the application of maximum molding pressure being of short duration by continuously changing the pressure from zero pressure to maximum pressure to zero pressure.

3. The method of preparing an uncooked sausage-type product from a comminuted meat mix, said method comprising roughly shaping an individual sausage-type product from said mix, at least shell freezing said product to an extent that substantial water crystallization occurs at and immediately beneath the surfaces thereof, molding said product into finished shape while still at least shell frozen and under molding pressure of at least about 200 p.s.i., and thereafter momentarily treating the surfaces of said product with a hot compatible liquid.

4. The method of preparing an uncooked sausage-type product from a comminuted meat mix, said method comprising roughly shaping an individual sausage-type product from said mix, at least shell freezing said product to an extent that substantial water crystallization occurs at and immediately beneath the surfaces thereof, molding said product into finished shape while still at least shell frozen and under molding pressure of at least about 200 p.s.i., momentarily treating the surfaces of said product with a hot compatible solution, and rapidly surface drying said product.

5. The method of claim 4 wherein said product is treated with said solution for a period of from about a fraction of one second to five seconds.

6. The method of claim 4 wherein said solution comprises sodium chloride and dextrose.

7. The method of claim 4 wherein said solution comprises 20% sodium chloride and 8% dextrose.

8. The method of claim 4 wherein said solution comprises 5% hydrolyzed vegetable protein.

9. The method of claim 4 wherein said solution comprises 10% sodium chloride.

10. The method of claim 4 wherein said solution comprises 3% alum.

11. The method of claim 4 wherein said solution comprises 20% sodium chloride, 20% corn syrup and 3% hydrolyzed vegetable protein.

12. The method of claim 4 wherein said solution comprises 10% calcium acid phytate.

13. The method of preparing an uncooked sausage-type product from a comminuted meat mix, said method comprising roughly shaping an individual sausage-type product from said mix, at least shell freezing said product to an extent that substantial water crystallization occurs at and immediately beneath the surfaces thereof, molding said product into finished shape while still at least shell frozen and under molding pressure of at least about 200 p.s.i., momentarily treating the surfaces of said product with a hot compatible solution, said solution being maintained at a temperature within a range of about 120° F. to 210° F., and rapidly surface drying said product.

14. The product prepared in accordance with the method of claim 1.

15. The product prepared in accordance with the method of claim 4.

References Cited in the file of this patent
UNITED STATES PATENTS

| | | |
|---|---|---|
| 1,964,010 | Vogt | June 26, 1934 |
| 1,964,011 | Vogt | June 26, 1934 |
| 2,729,947 | Cheyney | Jan. 10, 1956 |
| 2,799,585 | Hensgen et al. | July 16, 1957 |

UNITED STATES PATENT OFFICE
CERTIFICATE OF CORRECTION

Patent No. 3,063,842

November 13, 1962

Everett V. Podebradsky

It is hereby certified that error appears in the above numbered patent requiring correction and that the said Letters Patent should read as corrected below.

Column 4, line 16, after "product" insert -- is provided --; column 6, line 5, for "during" read -- using --.

Signed and sealed this 14th day of May 1963.

(SEAL)
Attest:

ERNEST W. SWIDER
Attesting Officer

DAVID L. LADD
Commissioner of Patents